US012622518B2

(12) United States Patent
Chang

(10) Patent No.: US 12,622,518 B2
(45) Date of Patent: May 12, 2026

(54) VARIABLE BUILT-IN WARDROBE

(71) Applicant: Jeung Won Chang, Seoul (KR)

(72) Inventor: Jeung Won Chang, Seoul (KR)

( * ) Notice: Subject to any disclaimer, the term of this patent is extended or adjusted under 35 U.S.C. 154(b) by 0 days.

(21) Appl. No.: 19/122,759

(22) PCT Filed: Nov. 13, 2023

(86) PCT No.: PCT/KR2023/018131
§ 371 (c)(1),
(2) Date: Apr. 21, 2025

(87) PCT Pub. No.: WO2024/122909
PCT Pub. Date: Jun. 13, 2024

(65) Prior Publication Data

US 2026/0007231 A1 Jan. 8, 2026

(30) Foreign Application Priority Data

Dec. 6, 2022 (KR) ........................ 10-2022-0169123
Nov. 6, 2023 (KR) ........................ 10-2023-0151706

(51) Int. Cl.
*A47B 61/00* (2006.01)
*A47B 83/00* (2006.01)
*E05F 15/70* (2015.01)

(52) U.S. Cl.
CPC .............. *A47B 61/00* (2013.01); *A47B 83/00* (2013.01); *E05F 15/70* (2015.01)

(58) Field of Classification Search
CPC ......... A47B 61/00; A47B 83/00; E05F 15/70; E04B 1/343; E04B 1/348; E04B 1/34861; E04H 1/12
See application file for complete search history.

(56) References Cited

U.S. PATENT DOCUMENTS 1,476,785 A * 12/1923 White .................... A47B 61/00 52/36.4
1,745,402 A * 2/1930 Bulck .................... A47B 61/00 312/246
1,758,291 A * 5/1930 McKnew ............... A47B 61/00 312/307

(Continued)

FOREIGN PATENT DOCUMENTS

BR 202015017904 U2 * 1/2017 ............. A47B 61/00
CN 118000528 A * 5/2024 ............... A61L 2/24

(Continued)

OTHER PUBLICATIONS

International Search Report for PCT/KR2023/018131 mailed Feb. 27, 2024 from Korean Intellectual Property Office.

*Primary Examiner* — Hanh V Tran
(74) *Attorney, Agent, or Firm* — Revolution IP, PLLC

(57) ABSTRACT

The present invention relates to a variable built-in wardrobe, and more particularly, to a variable built-in wardrobe configured to have a passage portion formed between a side dressing room and a center dressing room and allow a user to freely enter and exit both the side dressing room and the center dressing room through a door of the passage portion, thereby making it very convenient for putting clothes in or storing bedding, and configured to have a TV, a bookshelf, or the like installed on a front surface of the center dressing room, thereby enhancing space utilization and use convenience.

6 Claims, 12 Drawing Sheets

(56) References Cited

U.S. PATENT DOCUMENTS

| | | | | | |
|---|---|---|---|---|---|
| 2,654,241 | A * | 10/1953 | Schaefer | E05B 65/0003 292/341.15 |
| 2,674,767 | A * | 4/1954 | Fairhurst | A47B 61/00 16/245 |
| 3,596,297 | A * | 8/1971 | James | A47B 85/00 5/2.1 |
| 4,697,713 | A * | 10/1987 | Pryor | A47B 61/00 211/37 |
| 9,644,366 | B2 * | 5/2017 | Timur | G06Q 20/145 |
| 10,428,540 | B1 * | 10/2019 | Werner | E04H 3/02 |
| D868,291 | S * | 11/2019 | Lee | D25/1 |
| 10,874,210 | B1 * | 12/2020 | Visbeen | A47B 49/00 |
| 11,186,983 | B2 * | 11/2021 | Patterson | E04B 7/18 |
| 2007/0278914 | A1 * | 12/2007 | Verfaillie | A47B 88/42 312/226 |
| 2010/0264791 | A1 * | 10/2010 | Rajeswaran | A47B 83/00 312/330.1 |
| 2020/0095787 | A1 * | 3/2020 | Van Aukee | E04B 1/34861 |

FOREIGN PATENT DOCUMENTS

| | | | | |
|---|---|---|---|---|
| GB | 2213713 | A * | 8/1989 | A47B 87/00 |
| KR | 200217585 | Y1 * | 3/2001 | |
| KR | 200285498 | Y1 * | 8/2002 | |
| KR | 10-2004-0007180 | A | 1/2004 | |
| KR | 20120036539 | A * | 4/2012 | A47B 87/0284 |
| KR | 200470961 | Y1 * | 1/2014 | |
| KR | 10-1715597 | B1 | 3/2017 | |
| KR | 10-1736804 | B1 | 5/2017 | |
| KR | 20190109986 | A * | 9/2019 | E05B 1/0015 |
| KR | 10-2090867 | B1 | 3/2020 | |
| KR | 20-2020-0000513 | U | 3/2020 | |
| KR | 20200000513 | U * | 3/2020 | A47B 95/00 |
| KR | 10-2022-0134089 | A | 10/2022 | |
| WO | WO-2014041354 | A1 * | 3/2014 | E04H 14/00 |
| WO | WO-2016127326 | A1 * | 8/2016 | E05D 15/26 |
| WO | WO-2018132914 | A1 * | 7/2018 | E04H 1/02 |
| WO | WO-2020097517 | A1 * | 5/2020 | A47C 19/22 |

* cited by examiner

Prior Art

100

VARIABLE BUILT-IN WARDROBE

CROSS REFERENCE TO PRIOR APPLICATIONS

This application is a National Stage Application of PCT International Patent Application No. PCT/KR2023/018131 filed on Nov. 13, 2023, under 35 U.S.C. § 371, which claims priority to Korean Patent Application Nos. 10-2022-0169123 filed on Dec. 6, 2022, and 10-2023-0151706 filed on Nov. 6, 2022, which are all hereby incorporated by reference in their entirety.

TECHNICAL FIELD

The present invention relates to a variable built-in wardrobe, and more particularly, to a variable built-in wardrobe configured to have a passage portion formed between a side dressing room and a center dressing room and allow a user to easily enter and exit both the side dressing room and the center dressing room through a door portion provided at the passage portion.

BACKGROUND ART

Generally, a built-in wardrobe is a wardrobe that is attached to a wall or formed inside a wall and immovable, and a storage portion capable of storing clothes, bedding, or the like is formed therein.

In a storage space inside such a built-in wardrobe, moisture attracts pests or mold, causing damage to clothes or bedding or an unpleasant feeling due to an odor, or bacteria or the like growing on clothes or bedding cause respiratory diseases. In addition, since a built-in wardrobe is installed in an indoor wall, a phenomenon in which a structure of the built-in wardrobe that is made of wood is bent or twisted due to a humid environment occurs.

In addition, since the inside is humid, the environment is likely to be good for mold or other insects to live in. Here, since a back surface of the built-in wardrobe is made of plywood (wood), a problem in which the back surface is not only deformed but also rots and gives off unpleasant odors may also occur.

Further, existing dehumidifying structures for built-in wardrobes only perform a dehumidifying function for articles stored inside a built-in wardrobe and have limitations in preventing bending, mold growth, or pest infestation from occurring due to moisture on plywood or the like constituting a back surface and both side surfaces of the built-in wardrobe.

In addition, a built-in wardrobe is a wardrobe that is attached to and installed on a wall and has an advantage in terms of space utilization, but after the built-in wardrobe is installed, it is not easy to separate and move the built-in wardrobe, and there is difficulty in removing dust or the like that accumulates in a space between the built-in wardrobe and the wall.

In addition, a space is formed between a built-in wardrobe and a wall, dew formation occurs in the space due to a temperature difference between the wall and a rear surface of the built-in wardrobe, and mold grows due to the dew formation. In addition, there is a problem that the mold negatively affects not only the air inside the room but also the clothes and bedding stored inside the built-in wardrobe.

FIG. 1 is a perspective view illustrating a conventional built-in wardrobe.

As illustrated in FIG. 1, a conventional built-in wardrobe 10 includes a body 20 constituting a storage space and a door 30 rotatably installed on a front surface of the body 20 to open and close the inside of the body 20.

A holder 40 on which clothes can be held is installed on an inner upper portion of the body 20, and a lower portion of the body 20 is configured to store bedding or accessories.

Meanwhile, various pieces of furniture such as a bed and a TV are also installed indoors according to a user's preferences, and such furniture is usually mounted on a wall surface or installed close to the wall surface.

However, since the door 30 for opening and closing the inside of the conventional built-in wardrobe 10 is installed on the front surface thereof, it is disadvantageous in terms of space utilization or use convenience because it prevents installation of other furniture (for example, a TV, a bed, etc.) on the front surface of the built-in wardrobe 10.

RELATED ART DOCUMENT

Patent Document (Patent Document 1) Korean Patent Registration No. 10-2090867 (Date of Registration: Mar. 12, 2020)

DISCLOSURE

Technical Problem

In order to address the above-described problems of the related art, the present invention is directed to providing a variable built-in wardrobe with a new structure that has a passage portion formed between a side dressing room and a center dressing room and allows a user to easily enter and exit both the side dressing room and the center dressing room through a door portion provided at the passage portion.

The present invention is also directed to providing a variable built-in wardrobe in which an amount of clothes that can be held is adjustable (variable) by adjusting lengths of a side dressing room and a center dressing room and appropriately adjusting a length of a clothes hanging bar on which clothes can be put.

The present invention is also directed to providing a variable built-in wardrobe that allows any one of an armoire, a storage closet, and a dresser to be installed on a front surface of each of a side dressing room and a center dressing room.

The present invention is also directed to providing a variable built-in wardrobe in which a humidity level in a side dressing room and a center dressing room is detected and moisture is automatically removed, thereby keeping clothes, bedding, and the like dry and maintaining cleanliness to prevent the growth of mold and germs.

The present invention is also directed to providing a variable built-in wardrobe in which a passage portion is expanded or reduced according to a purpose of use and installed by varying a width of a door, thereby allowing a room to be added or a secret space to be formed inside a room.

Technical Solution

In order to address the above objectives, the present invention provides a variable built-in wardrobe installed with a built-in structure in a living room or another room to hold clothes or store bedding, the variable built-in wardrobe including:

at least one or more side dressing rooms each having a space portion therein in which to put clothes and a clothes hanging bar installed in a front-rear direction in the space portion;

a center dressing room disposed at predetermined intervals from the side dressing rooms and having a main space portion therein in which to put clothes and a pair of main clothes hanging bars installed in the front-rear direction in the main space portion; and a passage portion separating one side of each of the side dressing rooms and the center dressing room to form a space and having a door provided to allow entry and exit to and from the space.

In an embodiment of the present invention, any one of a storage groove configured to store a TV, a bed headboard, and a bookshelf may be formed or installed on a front surface of the center dressing room.

In an embodiment of the present invention, a front surface of each of the side dressing rooms and the center dressing room and a front surface of the door may be configured in the same shape and design.

In an embodiment of the present invention, any one of an armoire, a dressing table, a dresser, and a storage closet may be installed on a front surface of each of the side dressing rooms.

In an embodiment of the present invention, an auxiliary door may be installed to be opened and closed at an opening of each of the side dressing rooms and the center dressing room.

In an embodiment of the present invention, the auxiliary door may have a sensor installed thereon so that the auxiliary door is configured to be automatically opened or closed.

In an embodiment of the present invention, the passage portion may allow the side dressing rooms and the center dressing room to be used after opening the door and entering the main space portion through the space portion.

In an embodiment of the present invention, the passage portion may be installed by causing a floor and a wall to be exposed and varying a width of the door in accordance with a distance of a separation space.

In an embodiment of the present invention, the variable built-in wardrobe may further include: a humidity sensor installed in the side dressing rooms and the center dressing room to detect a humidity level;

a moisture remover for removing moisture in a case in which a predetermined humidity level or higher is detected by the humidity sensor; and a controller receiving a detection signal from the humidity sensor and automatically controlling the moisture remover to operate in a case in which the predetermined humidity level or higher is detected by the humidity sensor.

In an embodiment of the present invention, the controller may be configured to transmit the humidity level and operation information of the moisture remover to a mobile phone of a user through the Internet.

Advantageous Effects

A variable built-in wardrobe according to the present invention has a passage portion formed between a side dressing room and a center dressing room and allows a user to easily enter and exit both the side dressing room and the center dressing room through a door portion provided at the passage portion, thereby having an advantage in that it is convenient to put clothes in or store bedding.

In addition, since the variable built-in wardrobe is configured for a TV, a bookshelf, or the like to be installed on a front surface of the center dressing room, there is an advantage in that it is very advantageous in terms of space utilization or use convenience.

In addition, by allowing any one of an armoire, a storage closet, and a dresser to be installed on a front surface of each of the side dressing room and the center dressing room, there are advantages in that space utilization is enhanced and use convenience is good.

In addition, since a front surface of each of the side dressing room and the center dressing room and a front surface of the door are configured in the same shape and design, there is an advantage in that an exterior can be configured to be aesthetically pleasing and sophisticated like an art wall.

In addition, by detecting a humidity level in the side dressing room and the center dressing room and automatically removing moisture, clothes, bedding, and the like can be kept dry and cleanliness can be maintained to prevent the growth of mold and germs.

Further, since the passage portion is expanded or reduced according to a purpose of use and installed by varying a width of the door, there is an advantage in that a room can be added or a secret space can be formed inside a room.

MODES OF THE INVENTION

Figure 1:
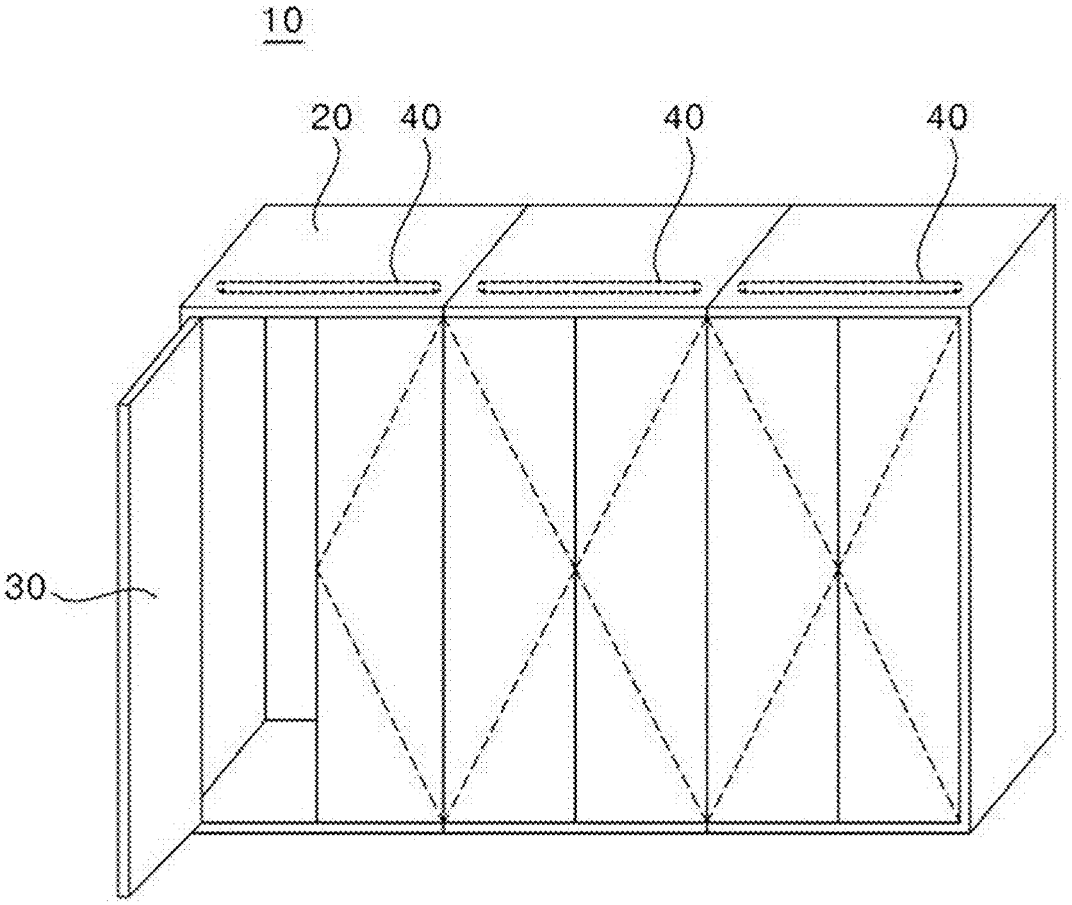
FIG. 1 is a perspective view illustrating a conventional built-in wardrobe.

Hereinafter, exemplary embodiments that allow those of ordinary skill in the art to which the present invention pertains to easily carry out the present invention will be described in detail with reference to the accompanying drawings. However, in describing operation principles for the exemplary embodiments of the present invention in detail, when it is determined that detailed description of a related known function or configuration may unnecessarily obscure the gist of the present invention, the detailed description thereof will be omitted.

In addition, throughout the drawings, like reference numerals are used for parts that have similar functions and effects.

In addition, throughout the specification, when a certain part is described as being "connected" to another part, this includes not only a case in which the part is directly connected to the other part but also a case in which the part is indirectly connected to the other part with another component disposed therebetween. In addition, "including" a certain component means that other components may be further included instead of excluding other components unless particularly stated otherwise.

Hereinafter, a variable built-in wardrobe according to an exemplary embodiment of the present invention will be described in detail with reference to the accompanying drawings.

Figure 2:
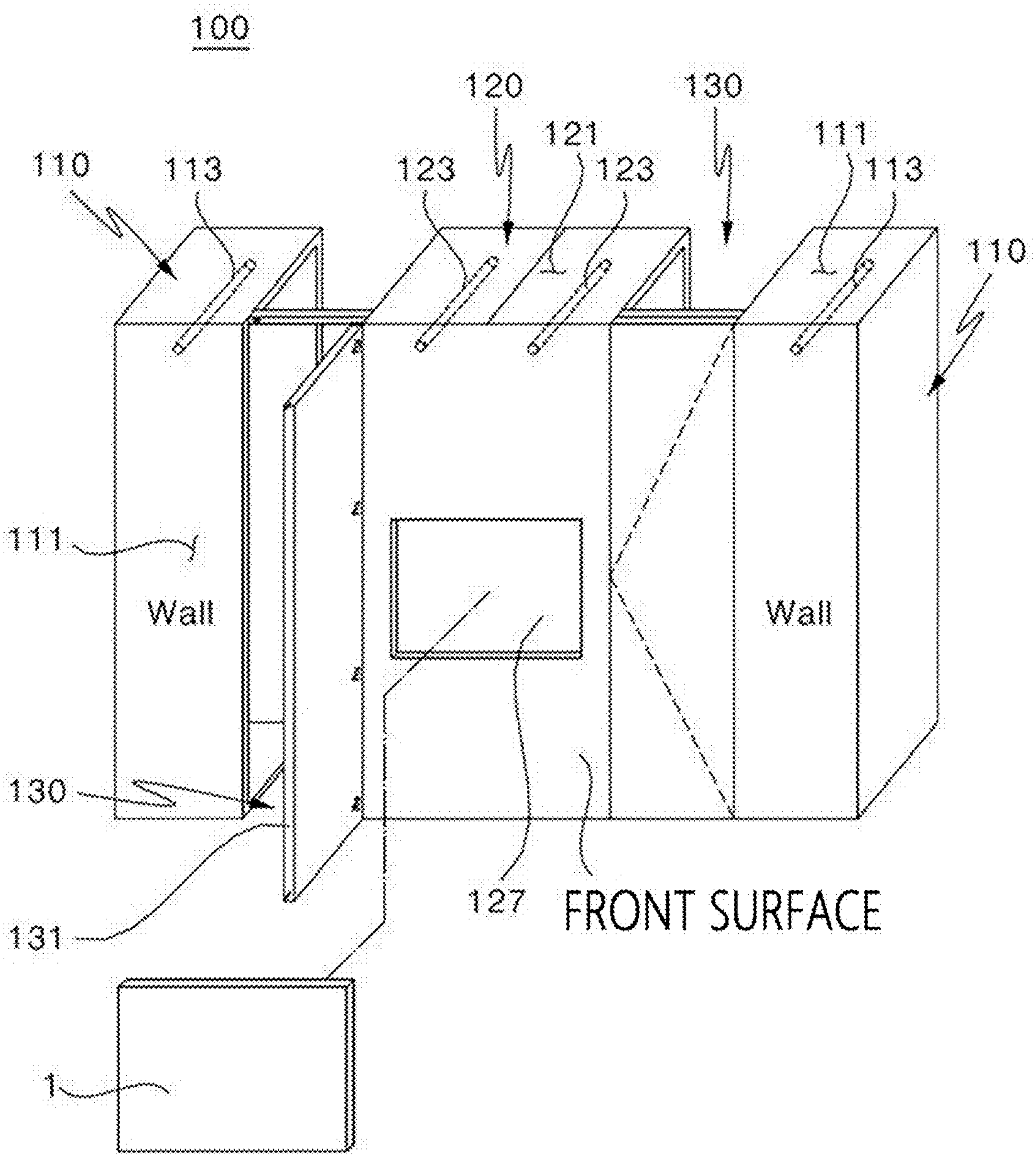
FIG. 2 is an exemplary view in which a TV is installed in a storage groove formed in a front surface of a center dressing room of a variable built-in wardrobe according to an embodiment of the present invention.
Figure 3:
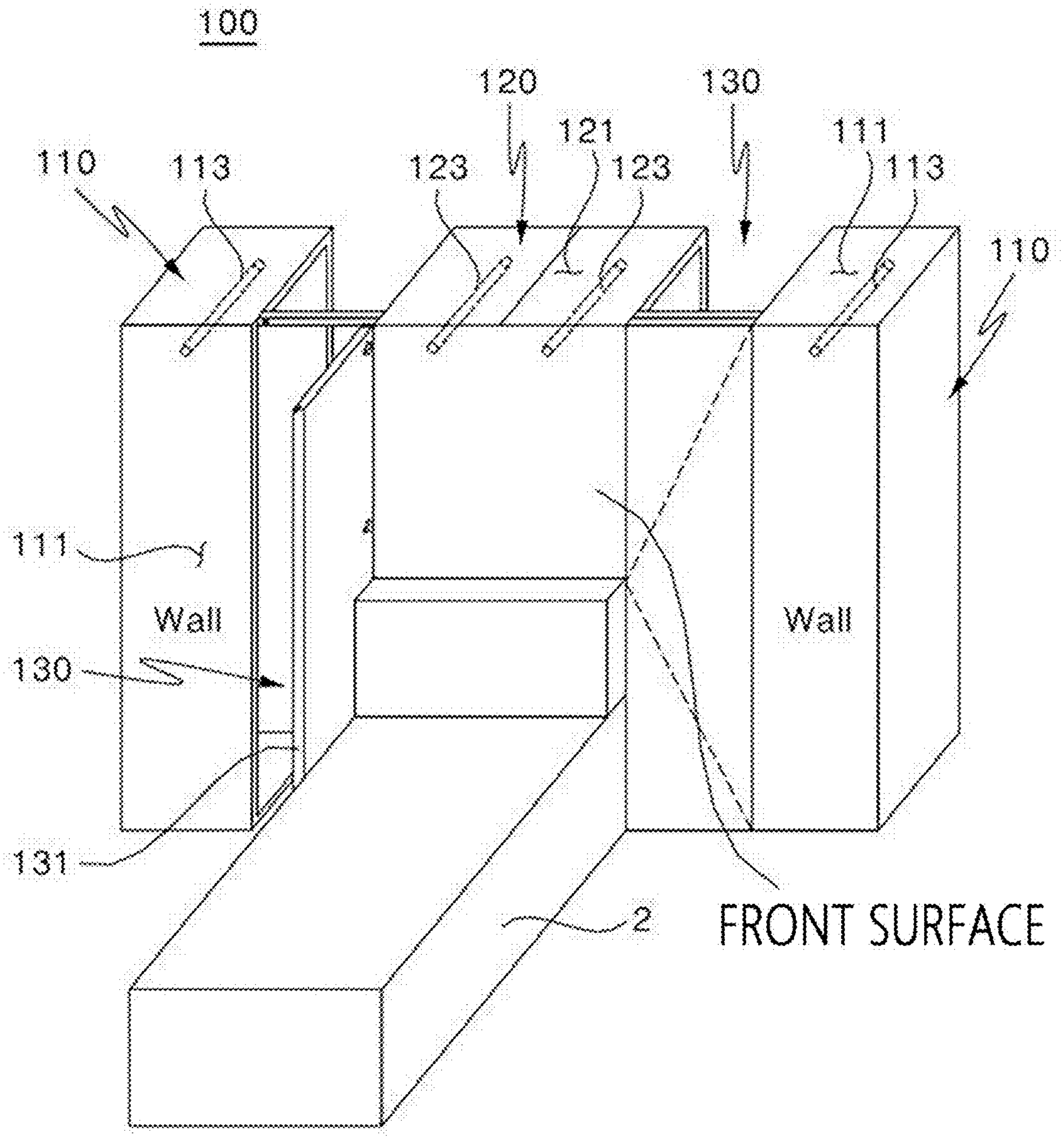
FIG. 3 is an exemplary view in which a bed headboard is installed on the front surface of the center dressing room of FIG. 2.
Figure 4:
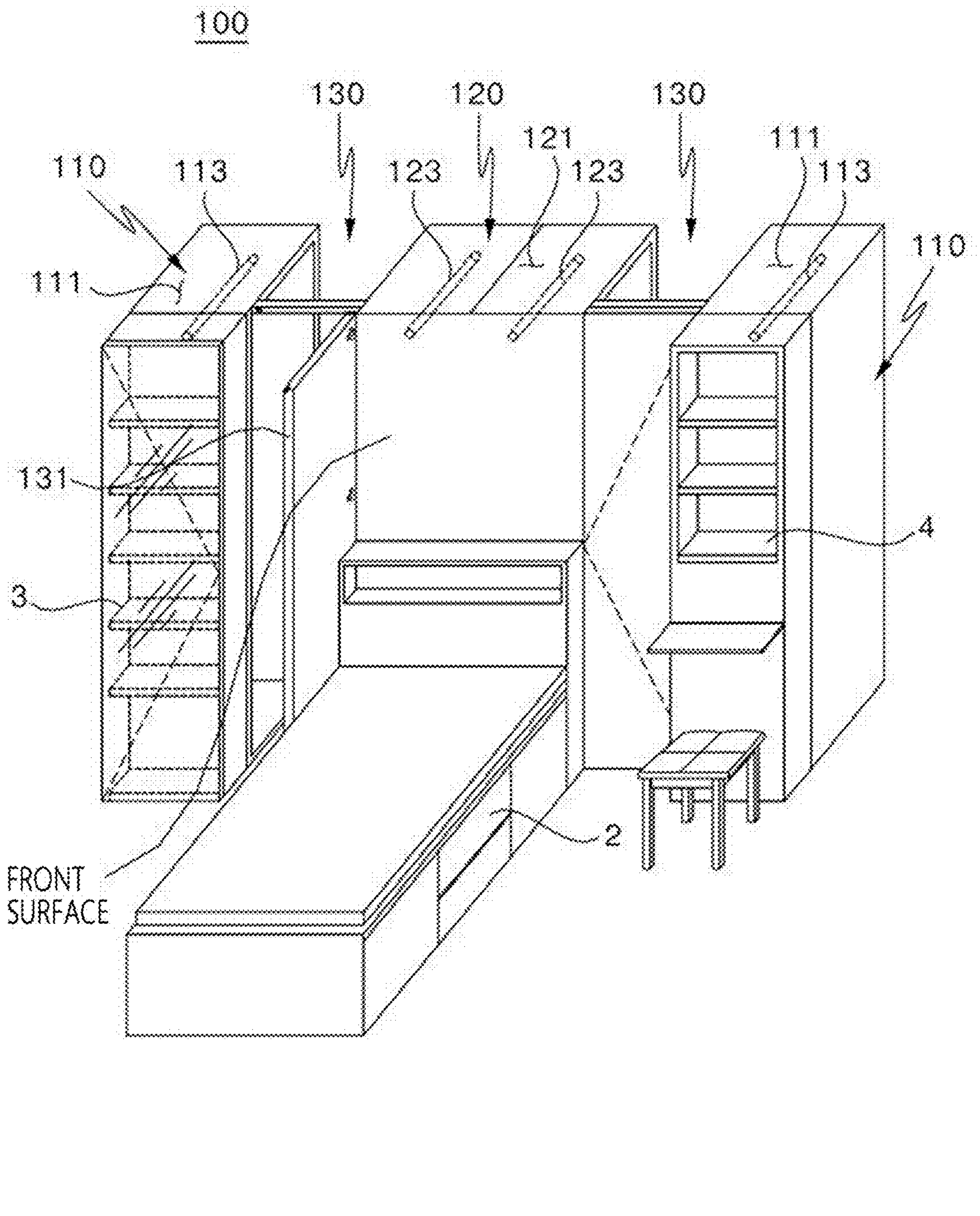
FIG. 4 is an exemplary view in which a storage closet and a dressing table are each installed on a front surface of one of side dressing rooms of the variable built-in wardrobe according to an embodiment of the present invention.
Figure 5:
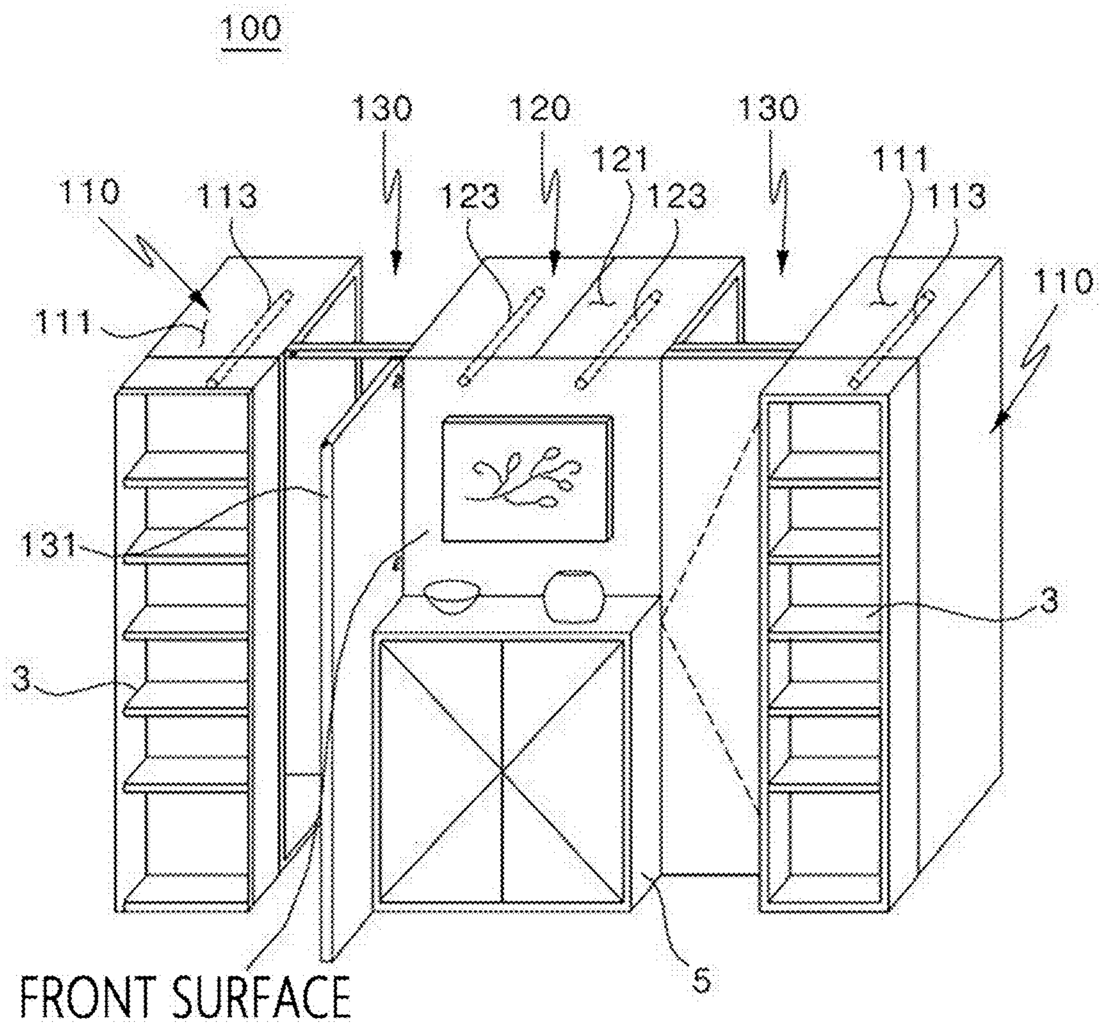
FIGS. 5 and 6 are exemplary views in which furniture is installed on the front surface of the variable built-in wardrobe according to an embodiment of the present invention.
Figure 6:
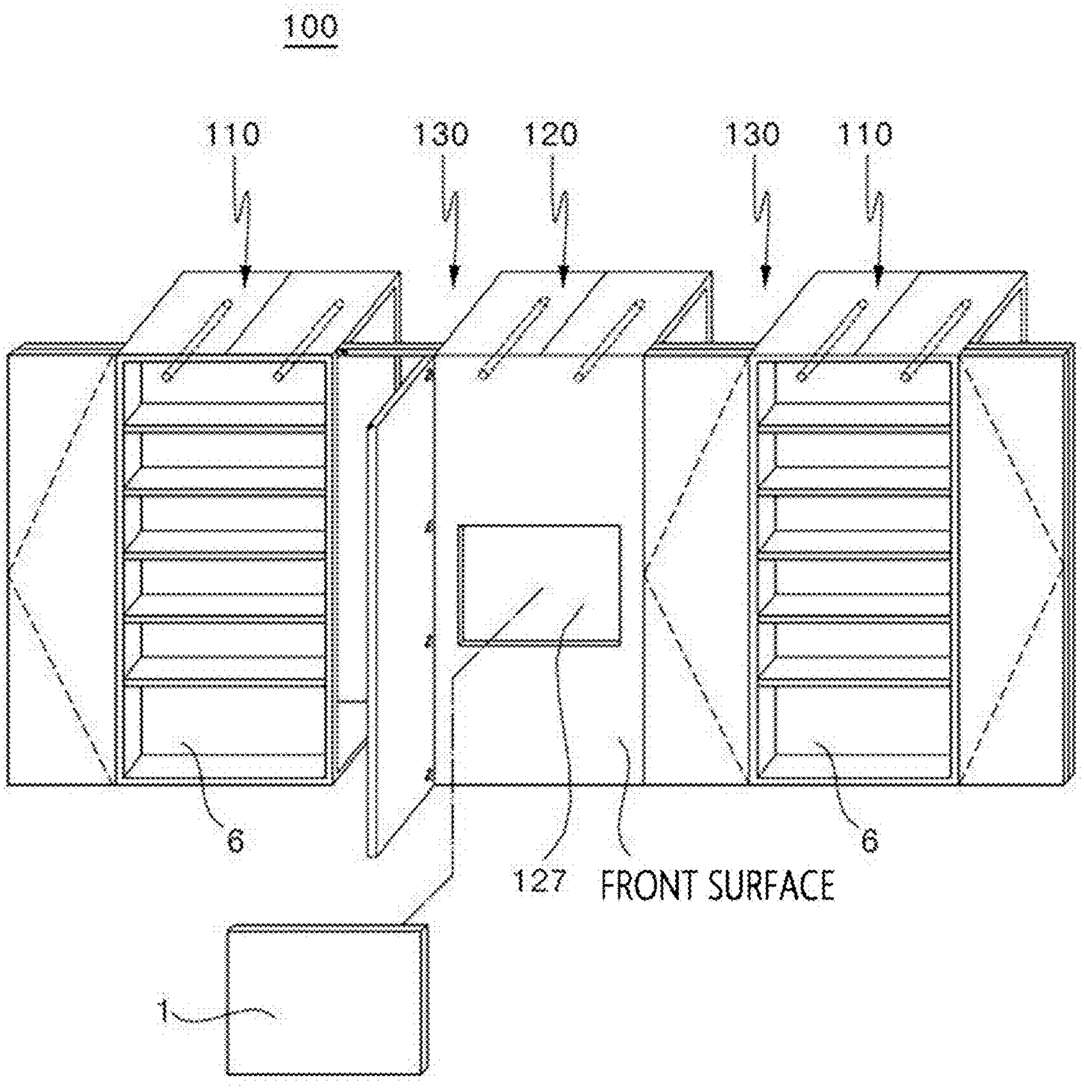
Figure 7:
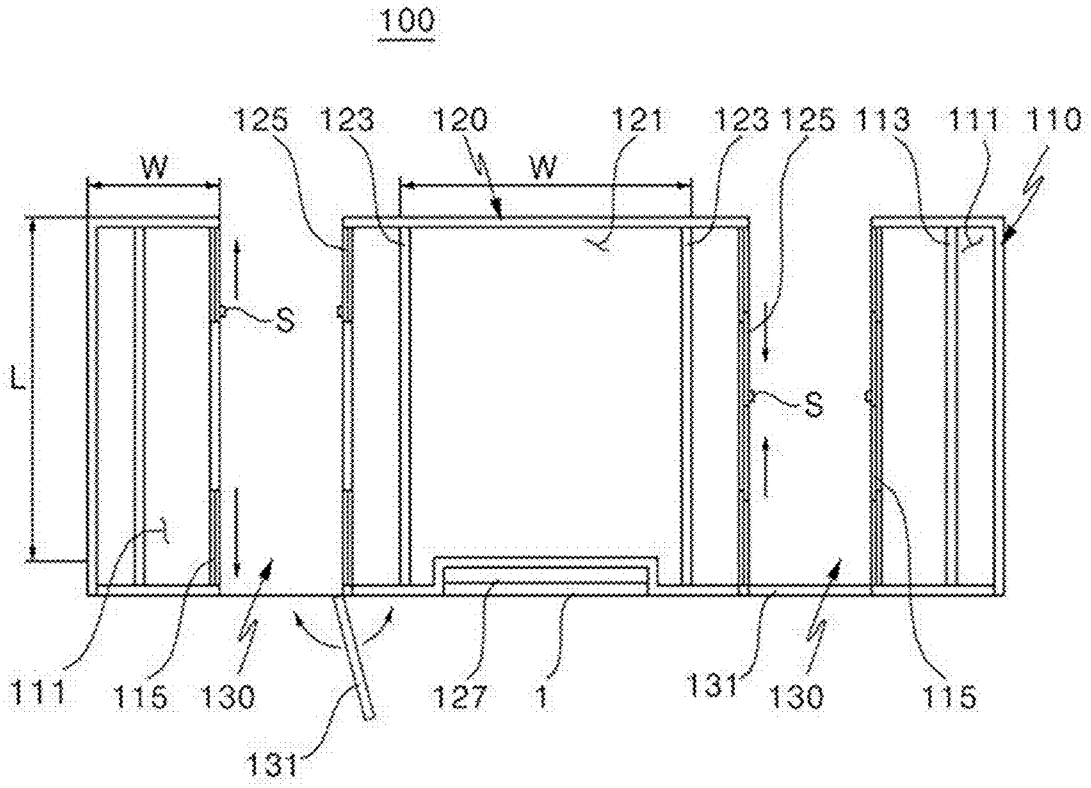
FIG. 7 is a plan view illustrating opening and closing states of auxiliary doors of the variable built-in wardrobe according to an embodiment of the present invention.
Figure 8:
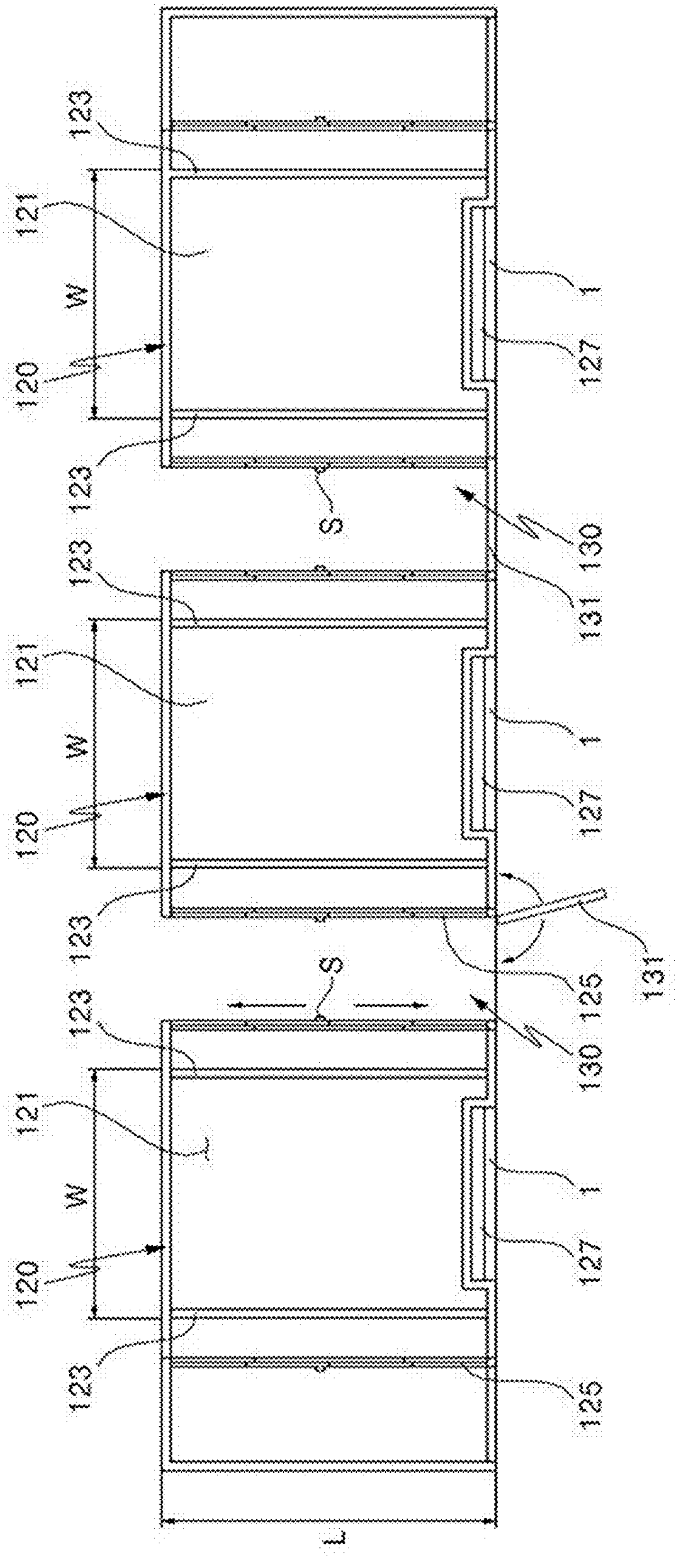
FIG. 8 is an exemplary view in which the variable built-in wardrobe according to an embodiment of the present invention is expanded in accordance with the size of an installation space thereof.
Figure 9:
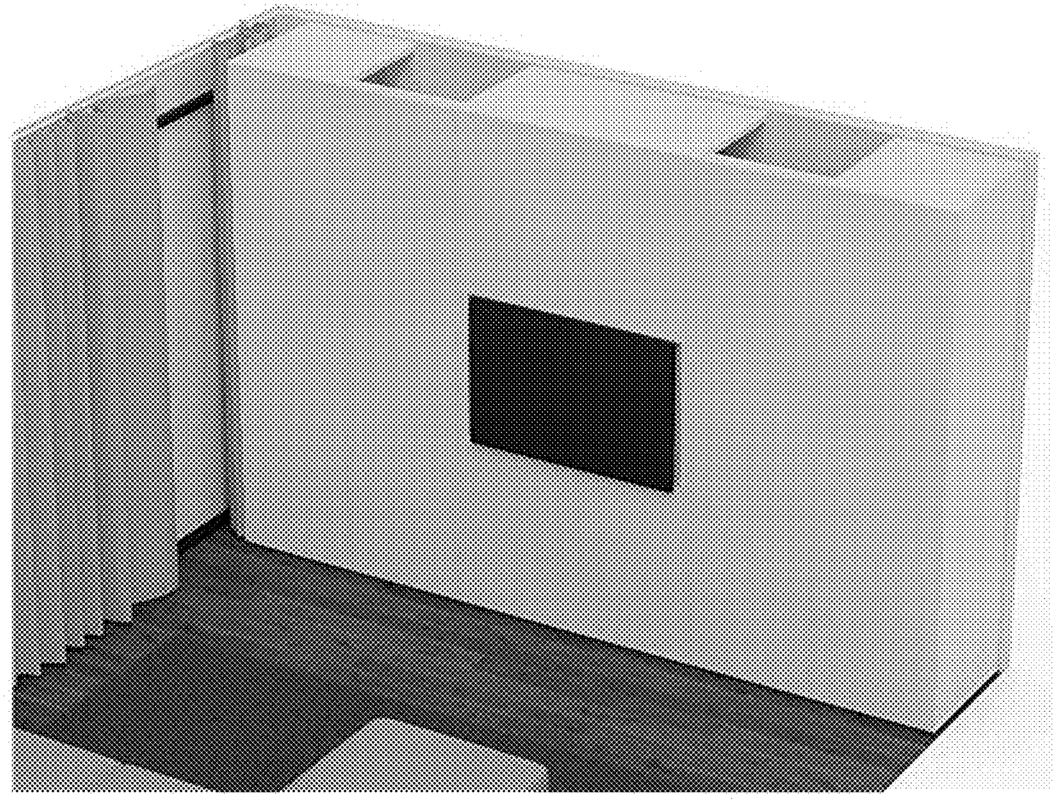
FIGS. 9 and 10 are exemplary views illustrating the concept of FIG. 2 by rendering.
Figure 10:
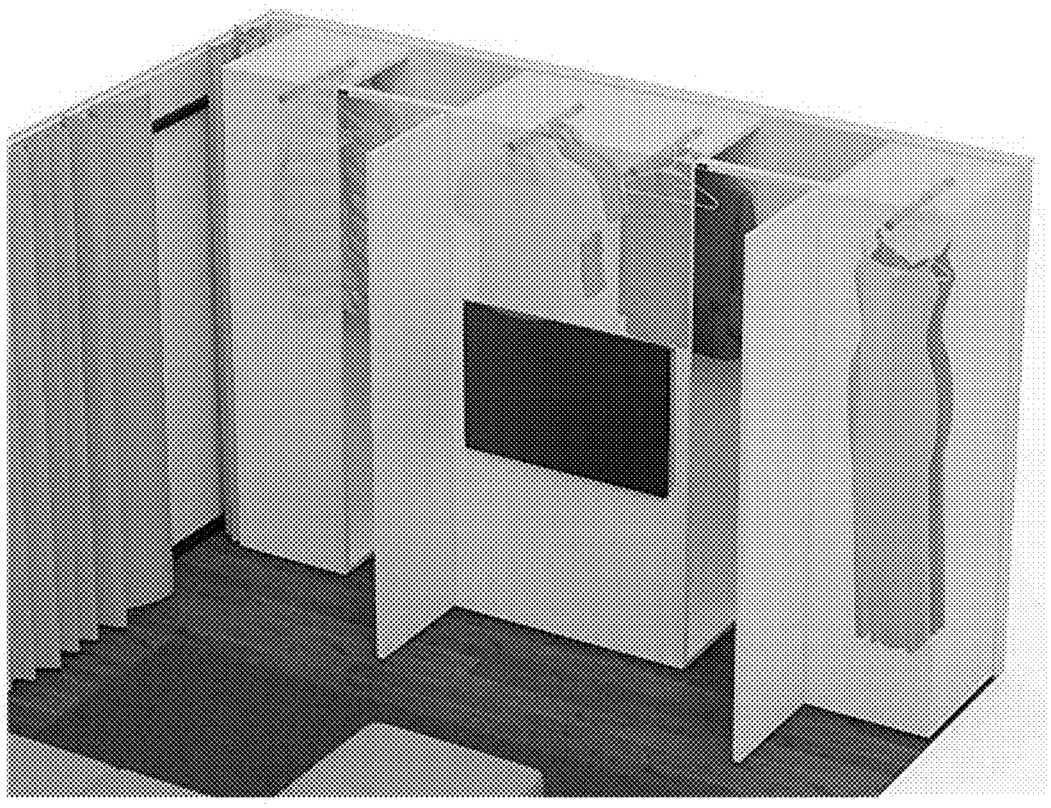

FIG. 2 is an exemplary view in which a TV is installed in a storage groove formed in a front surface of a center dressing room of a variable built-in wardrobe according to an embodiment of the present invention, FIG. 3 is an exemplary view in which a bed headboard is installed on the front surface of the center dressing room of FIG. 2, FIG. 4 is an exemplary view in which a storage closet and a dressing table are each installed on a front surface of one of side dressing rooms of the variable built-in wardrobe according to an embodiment of the present invention, FIGS. 5 and 6 are exemplary views in which furniture is installed on the front surface of the variable built-in wardrobe according to an embodiment of the present invention, FIG. 7 is a plan view illustrating opening and closing states of auxiliary doors of the variable built-in wardrobe according to an embodiment of the present invention, FIG. 8 is an exemplary view in which the variable built-in wardrobe according to an embodiment of the present invention is expanded in accordance with the size of an installation space thereof, and FIGS. 9 and 10 are exemplary views illustrating the concept of FIG. 2 by rendering.

As illustrated in FIG. 2, a variable built-in wardrobe 100 according to an embodiment of the present invention includes side dressing rooms 110, a center dressing room 120, and a passage portion 130.

More specifically, as illustrated in FIGS. 2 and 7, the variable built-in wardrobe 100 according to an embodiment of the present invention is a variable built-in wardrobe installed with a built-in structure in a living room or another room to put clothes in or store bedding, and the variable built-in wardrobe 100 includes at least one or more side dressing rooms 110 each having a space portion 111 therein to put clothes in and a clothes hanging bar 113 installed in a front-rear direction in the space portion 111, a center dressing room 120 disposed at predetermined intervals from the side dressing rooms 110 and having a main space portion 121 therein in which to put clothes and a pair of main clothes hanging bars 123 installed in the front-rear direction in the main space portion 121, and a passage portion 130 separating one side of each of the side dressing rooms 110 and the center dressing room 120 to form a space and having a door 131 provided to allow entry and exit to and from the space.

Referring to FIGS. 2 and 7, as the at least one or more side dressing rooms 110, a pair of side dressing rooms 110 may be disposed, or two side dressing rooms 110 may be disposed on either side of the center dressing room 120. In addition, one side dressing room 110 may be installed on one side of the center dressing room 120.

For example, if the size of a living room or other room is small, one side dressing room 110 and one passage portion 130 may be installed, or a basic structure in which a pair of side dressing rooms 110 are disposed, a center dressing room 120 is installed therebetween, and a passage portion 130 is provided as a pair and installed on either side of the center dressing room 120 may be formed. In addition, if the size of a living room or other room is large, an expanded structure in which three or more side dressing rooms 110 and three or more passage portions 130 are installed may be formed.

In addition, as illustrated in FIG. 2, the side dressing room 110 has a single clothes hanging bar 113 longitudinally installed in the front-rear direction in the space portion 111 to store clothes, thereby allowing a user to enter the passage portion 130 and select clothes stored on the clothes hanging bar 113 through the space portion 111.

In addition, as illustrated in FIG. 7, by adjusting a length L of the side dressing room 110 and adjusting the space portion 111, it is possible to adjust a length of the clothes hanging bar 113 and freely adjust the amount of clothes that can be put on it.

Referring to FIGS. 2 to 7, the center dressing room 120 may be located at the center, and the side dressing rooms 110 may be located at both sides of the center dressing room 120 at predetermined intervals therefrom. In addition, the pair of main clothes hanging bars 123 are longitudinally installed in the front-rear direction in the main space portion 121.

In addition, any one of a storage groove 127 configured to store a TV 1, a bed headboard 2, and a bookshelf may be formed or installed on a front surface of the center dressing room 120. Here, as illustrated in FIGS. 3 and 4, the front surface of the center dressing room 120 itself may be used as a bed headboard.

In addition, the size of the storage groove 127 may be changed to install and store a TV 1 of various sizes in the storage groove 127.

Like the side dressing room 110 described above, by adjusting a length L of the center dressing room 120 and adjusting the main space portion 121, it is possible to adjust a length of the main clothes hanging bars 123 and freely adjust the amount of clothes that can be put on it.

In addition, as illustrated in FIG. 8, at least one or more center dressing rooms 120 may be provided, and a side dressing room 110 may be disposed between each pair of center dressing rooms 120.

For example, three center dressing rooms 120 may be disposed, and a passage portion 130 may be disposed between each pair of center dressing rooms 120 to allow the main space portion 121 formed in each center dressing room 120 to communicate with the passage portion 130 and allow a user to enter through the passage portion 130 at any one side and exit through the passage portion 130 at the other side.

Meanwhile, as illustrated in FIGS. 7 and 8, the length L and widths W of the side dressing rooms 110 and the center dressing rooms 120 of the present invention may be formed in various sizes. In other words, the length L of the side dressing rooms 110 and the center dressing rooms 120 may be set to 800 mm, the width W of the side dressing rooms 110 may be set to 550 mm, the width W of the passage portions 130 may be set to range from 700 to 940 mm, and the width W of the center dressing rooms 120 may be set to 550 mm. This is one example for describing the present invention, and the above-mentioned length L and widths W may have various other values according to the size of a living room or other room.

In addition, as illustrated in FIGS. 9 and 10, a front surface of each of the side dressing rooms 110 and the center dressing room 120 and a front surface of the door 131 may be configured in the same shape and design, and an exterior can be configured to be aesthetically pleasing and sophisticated like an art wall instead of looking like a built-in wardrobe.

In particular, as illustrated in FIGS. 2 and 10, free movement may be allowed through the space portion 111 and the main space portion 121 to allow clothes stored in the side dressing rooms 110 and the center dressing room 120 to be selected after opening the door 131 formed at the passage portion 130 which will be described below. For detailed description thereof, description of an opening below may be referenced.

In addition, as illustrated in FIGS. 4 to 6, any one of an armoire 3, a dressing table 4, a dresser 5, and a storage closet 6 may be installed on a front surface of each of the side dressing rooms 110 and the center dressing room 120.

That is, in a space of a studio apartment or a small room, a front surface of the side dressing room 110 may be closed and any of the armoire 3, the dressing table 4, the dresser 5, and the storage closet 6 may be installed as desired to enhance space utilization, and desired clothes may be selected through the passage portion 130, thereby making it possible to more efficiently use the small space.

In addition, as illustrated in FIG. 7, auxiliary doors 115 and an auxiliary door 125 may be installed to be opened and closed at openings of the side dressing rooms 110 and an opening of the center dressing room 120, respectively.

Here, as illustrated in FIGS. 7 and 10, the openings may open the space portion 111 formed in each of the side dressing room 110 for the side dressing room 110 to communicate with the passage portion 130 and may open the main space portion 121 formed in the center dressing room 120 for both sides of the center dressing room 120 to communicate with the passage portion 130.

The auxiliary doors 115 and 125 each have a sensor S installed thereon so that the auxiliary doors 115 and 125 are configured to be automatically opened or closed, and the auxiliary doors 115 and 125 may be configured to automatically open when a user is in the vicinity thereof and close when a predetermined amount of time passes after the user exits.

Referring to FIGS. 2 to 7, the passage portion 130 separates one side of each of the side dressing rooms 110 and the center dressing room 120 to form a space and has the door 131 provided to allow entry and exit to and from the space.

That is, the passage portion 130, which is a space in which the user can move, is formed between each of the side dressing rooms 110 and the center dressing room 120, and the door 131 is installed to be able to open and close on the front surface of the passage portion 130.

Accordingly, the passage portion 130 serves to allow the side dressing rooms 110 and the center dressing room 120 to be used after entering the main space portion 121 through the space portion 111.

In particular, the passage portion 130 may be installed by causing a floor and a wall to be exposed and varying a width of the door 131 in accordance with a distance of a separation space.

For example, when forming the passage portion 130 of the present invention in a typical built-in wardrobe, since a passage is integrally formed while connected to other furniture, when the size of a living room or other room changes due to moving to a different house, a new built-in wardrobe with a different size should be installed. On the other hand, when the floor and the wall of the passage portion 130 are exposed, the built-in wardrobe can be reused after adjusting the size of the door 131.

That is, as illustrated in FIG. 7, by expanding or reducing the width of the passage portion 130 in accordance with the size of a living room or other room and also adjusting the size of the width of the door 131 in accordance with the passage portion 130, the built-in wardrobe can be reused.

In addition, the passage portion 130 may be utilized as a secret space and may be used as a safe, an ironing space, a tool display space, and the like.

Referring to FIGS. 2 and 7, the door 131 is installed to be able to open and close on the front surface of the passage portion 130 and may be installed with not only a hinged structure but also a sliding structure (not illustrated). That is, both the side dressing rooms 110 and the center dressing room 120 are configured to be conveniently used after entering the passage portion 130 through the door 131.

Accordingly, the passage portion 130 may preferably be formed with a suitable size so as not to interfere with movement of a user.

Figure 11:
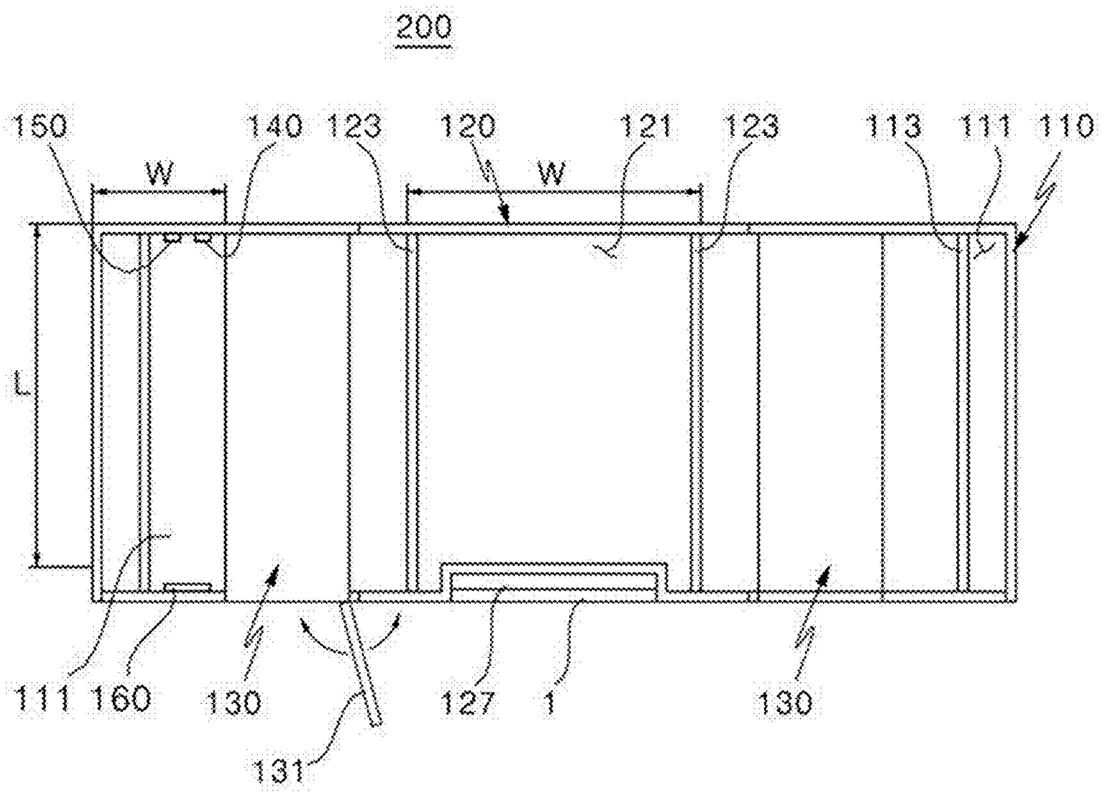
FIG. 11 is a plan view illustrating a variable built-in wardrobe according to another embodiment of the present invention.
Figure 12:
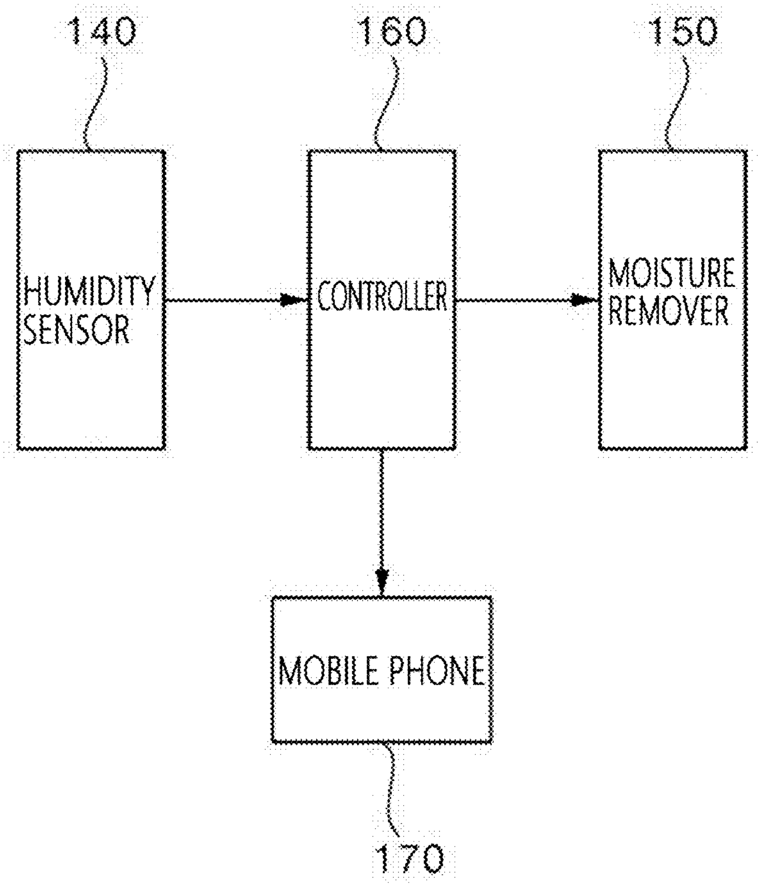
FIG. 12 is a block diagram for describing automatic humidity level adjustment in a side dressing room and a center dressing room of the variable built-in wardrobe according to another embodiment of the present invention.

FIG. 11 is a plan view illustrating a variable built-in wardrobe according to another embodiment of the present invention, and FIG. 12 is a block diagram for describing automatic humidity level adjustment in a side dressing room and a center dressing room of the variable built-in wardrobe according to another embodiment of the present invention.

FIGS. 11 and 12 show a variable built-in wardrobe 200 according to another embodiment of the present invention, the same reference numerals are assigned to the same components as those of the variable built-in wardrobe 100 according to the above-described embodiment of the present invention, detailed description thereof will be omitted, and only added components will be described in detail.

As illustrated in FIGS. 11 and 12, the variable built-in wardrobe 200 according to another embodiment of the present invention includes side dressing rooms 110, a center dressing room 120, passage portions 130, a humidity sensor 140, a moisture remover 150, and a controller 160.

More specifically, the variable built-in wardrobe 200 according to another embodiment of the present invention includes the side dressing rooms 110, the center dressing room 120, the passage portions 130, the humidity sensor 140 installed in the side dressing rooms 110 and the center dressing room 120 to detect a humidity level, the moisture remover 150 for removing moisture in a case in which a predetermined humidity level or higher is detected by the humidity sensor 140; and the controller 160 receiving a detection signal from the humidity sensor 140 and automatically controlling the moisture remover 150 to operate in a case in which the predetermined humidity level or higher is detected by the humidity sensor 140.

By detecting the humidity level in each of the side dressing rooms 110 and the center dressing room 120 and automatically removing moisture therefrom, the variable built-in wardrobe 200 according to another embodiment of the present invention can keep clothes, bedding, and the like dry and clean at all times and can always maintain cleanliness to prevent the growth of mold and germs.

For example, the moisture remover 150 may be configured as a heater or a moisture removing filter that sucks in and removes moisture.

The controller 160 may be configured to transmit the humidity level and operation information of the moisture remover 150 to a mobile phone 170 of a user through the Internet, and in this way, the user can check the humidity level inside the variable built-in wardrobe and the operation situation of the moisture remover in real time even at a remote place.

Exemplary embodiments of the present invention have been described above in the detailed description of the present invention, but these are only examples of most favorable embodiments and are not intended to limit the present invention. In addition, of course, those of ordinary skill in the art to which the present invention pertains can make various modifications and imitations within the scope not departing from the scope of the technical spirit of the present invention.

Therefore, the scope of rights of the present invention is not limited to the above-described embodiments and may be implemented in various forms of embodiments within the scope of the appended claims. In addition, various modifications made by any one of ordinary skill in the art to which the present invention pertains without departing from the gist of the present invention are deemed as belonging to the scope of the claims of the present invention.

The invention claimed is:

1. A variable built-in wardrobe installed with a built-in structure in a living room or another room to hold clothes or store bedding, the variable built-in wardrobe comprising:

at least one or more side dressing rooms (110) each having a space portion (111) therein in which to put clothes and a clothes hanging bar (113) installed in a front-rear direction in the space portion (111);

a center dressing room (120) disposed at predetermined intervals from the at least one or more side dressing rooms (110), having a main space portion (121) therein in which to put clothes and a pair of main clothes hanging bars (123) installed in the front-rear direction in the main space portion (121), and having any one of a storage groove (127) configured to store a TV (1), a bed headboard (2), and a bookshelf formed or installed on a front surface thereof; and a passage portion (130) separating one side of each of the at least one or more side dressing rooms (110) and the center dressing room (120) to form a space and allowing the at least one or more side dressing rooms (110) and the center dressing room (120) to be used after opening a door (131), which is provided to allow entry and exit to and from the space, and entering the main space portion (121) through the passage portion (130), wherein, in a case in which the passage portion (130) is disposed at both sides of the center dressing room (120), or three center dressing rooms (120) are disposed and the passage portion (130) is disposed between each pair of center dressing rooms (120), the main space portion (121) is allowed to communicate with the passage portion (130) by the clothes hanging bar (113) and the pair of main clothes hanging bars (123) to allow entry through the passage portion (130) at any one side and exit through the passage portion (130) at the other side, and the passage portion (130) is installed such that a floor and a wall are exposed in the passage portion and a width of the door (131) is adjusted in accordance with the passage portion, wherein auxiliary doors (115) and an auxiliary door (125) are installed to be opened and closed at openings of the at least one or more side dressing rooms (110) and an opening of the center dressing room (120), respectively.

2. The variable built-in wardrobe of claim 1, wherein a front surface of each of the at least one or more side dressing rooms (110) and the center dressing room (120) and a front surface of the door (131) are configured in the same shape and design.

3. The variable built-in wardrobe of claim 1, wherein any one of an armoire (3), a dressing table (4), a dresser (5), and a storage closet (6) is installed on a front surface of each of the at least one or more side dressing rooms (110) and the center dressing room (120).

4. The variable built-in wardrobe of claim 1, wherein the auxiliary doors (115)(125) each have a sensor(S) installed thereon so that the auxiliary doors (115)(125) are configured to be automatically opened or closed.

5. The variable built-in wardrobe of claim 1, further comprising:

a humidity sensor (140) installed in the at least one or more side dressing rooms (110) and the center dressing room (120) to detect a humidity level;

a moisture remover (150) for removing moisture in a case in which a predetermined humidity level or higher is detected by the humidity sensor (140); and a controller (160) receiving a detection signal from the humidity sensor (140) and automatically controlling the moisture remover (150) to operate in a case in which the predetermined humidity level or higher is detected by the humidity sensor (140).

6. The variable built-in wardrobe of claim 5, wherein the controller (160) is configured to transmit the humidity level and operation information of the moisture remover to a mobile phone (170) of a user through the Internet.

* * * * *